Figure 1:
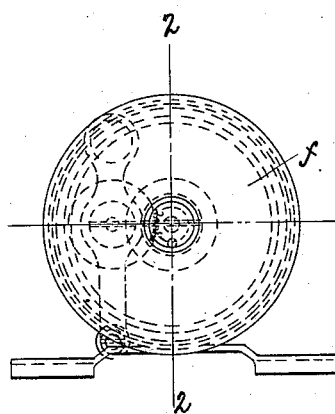

W. T. BRONSON.
BAIT CASTING REEL.
APPLICATION FILED SEPT. 28, 1908.

937,672.

Patented Oct. 19, 1909.

WITNESSES:
Walter M. Dickinson
W. Keyes

INVENTOR
W. Bronson
BY
ATTORNEY

UNITED STATES PATENT OFFICE.

WALTER T. BRONSON, OF MISHAWAKA, INDIANA.

BAIT-CASTING REEL.

937,672.　　　　　Specification of Letters Patent.　　Patented Oct. 19, 1909.

Application filed September 28, 1908. Serial No. 455,146.

*To all whom it may concern:*

Be it known that I, WALTER T. BRONSON, a citizen of the United States, residing at Mishawaka, in the county of St. Joseph and State of Indiana, have invented certain new and useful Improvements in Bait-Casting Reels, of which the following is a specification.

This invention relates to bait casting reels and has for one of its objects to provide a simply constructed governor attachment whereby the speed of the outgoing line is automatically controlled and the length of the cast likewise controlled and rendered uniform without the necessity for attention from the operator.

It is well known that in "bait casting" much care is required in handling the reel to cause the line to pay out with a certain speed to cause the bait to be delivered at the proper point, and this speed and the length of the "cast" are generally controlled by the pressure of the thumb of the operator upon the reel, and generally known as "thumbing", and to impart exactly the right pressure to the reel is acquired only by long practice and the exercise of skill and patience. If the pressure is too slight, the reel revolves too rapidly and faster than the line, and causes the latter to "overrun" and become tangled. On the other hand, if the pressure is too great, the line is retarded and the distance of the cast lessened.

The principal object of the present invention is to govern the speed of the reel automatically and dispense with the "thumbing" action of the operator. With the improved attachment, therefore, it will not be necessary to learn the art of "thumbing" to successfully "cast" a bait line.

In swinging the casting rod to make a "cast" with an ordinarily constructed reel, the weight of the bait as the thumb is actuated to release the reel, imparts a sudden start to the spool, and if not retarded by "thumbing" or otherwise checked, will revolve more rapidly than the line pays out, and as the line pays out the diameter of its windings on the spool decreases, causing acceleration of the speed of the revolution proportionately as the diameter decreases. If the speed of the spool at the start of the cast is properly retarded, so as to revolve at no greater speed than the line is paying out, the one gradually adjusts itself to the other, so that eventually there is uniformity between the line and the reel. It is therefore evident that the means for governing the speed must be variable, that is that the retarding must not be constant, otherwise the length of the "cast" would be materially reduced. It is therefore necessary in order to automatically accomplish this function of governing the speed at which the line is paying out with relation to the speed of revolution of the spool, and at the same time reduce the retarding function of the governor as the speed of these elements becomes gradually equalized, that a governing means be employed which, as the necessity for the same is gradually diminished and finally disappears, will automatically meet these requirements.

The device which is the subject of the present application is designed to accomplish these results and the invention consists generally in a plate or disk freely rotatable upon one of the trunnions of the spool, a hollow conical bearing carried by the spool and a ball between the bearing and plate. By this arrangement the spool is prevented from running too fast at the beginning of the cast.

Figure 2:
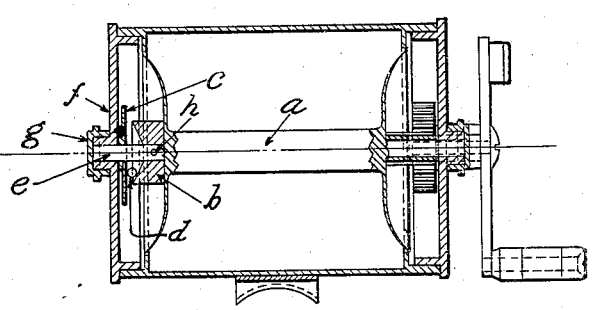
Figure 4:
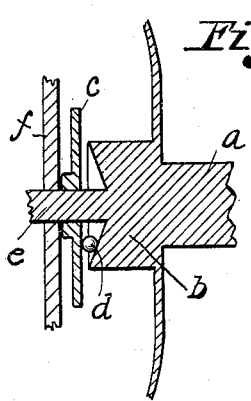
Figure 3:
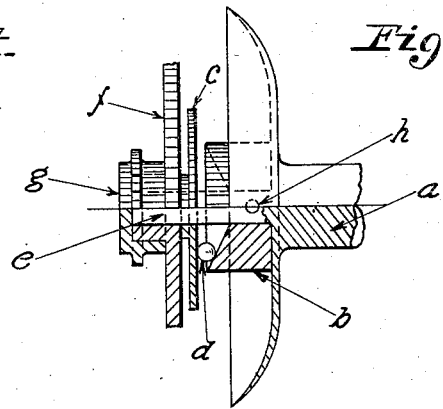

In the drawings illustrative of the preferred embodiment of the invention, Figure 1 is an end elevation of a casting reel with the improvements embodied therein. Fig. 2 is a section on the line 2—2 of Fig. 1. Fig. 3 is a sectional detail enlarged, illustrating the construction more fully. Fig. 4 is a sectional detail illustrating a modification in the construction.

The improved device embraces a reel substantially of ordinary construction and can be applied without material structural changes to reels of various forms and it is not desired therefore to limit the invention to use upon any particular make of reel.

The reel employed for the purpose of illustration consists of a drum or spool *a* having the usual flanged ends and with a trunnion *e* at one end journaled in the head *f*, the journal having a cap *g* to receive the end thrust of the spool.

Mounted loosely upon the trunnion *e* and bearing against the inner face of the head member *f* is a disk *c*, and rigidly connected by a pin *h* or other suitable fastening means to the trunnion and bearing against the adjacent end of the spool is a collar *b* having a hollow or cone shaped cavity in its outer face and confronting the plate or disk *c*.

Bearing loosely in the conical cavity is a ball *d*. As the spool is rotated by the outrunning line the friction of the ball *d* against the disk *c*, which disk is stationary when cast is made, causes the spool to be retarded, but the continued friction of the ball against the slower moving disk causes the latter to gradually increase its speed, until both spool and disk are revolving at approximately the same speed. By this arrangement the greatest retarding friction is applied at the start of the cast, as the disk is stationary at that time. As the line on the spool is running out, the diameter is gradually decreasing and the revolutions of the spool correspondingly increasing, but as the running out of the line and revolution of the spool gradually attain relative uniformity and steadiness, the speed of retarding disk gradually increases and this automatically and gradually reduces its retarding action, on the spool as the necessity for same decreases, thereby permitting the bait to be cast greater distances than would be possible by the use of governing means operating to exert a greater and constant retarding action with a corresponding increase in the revolution of the spool.

It is obvious that the disk *c* may be mounted on the trunnion *e* so as not to have any frictional contact with the casing whatever, and thus materially reduce the retarding action of the disk, in order to obtain greater delicacy of action between the spool and retarding disk.

The action is automatic and uniform, and there is no necessity for thumbing the reel except shortly before the bait strikes the water, in order to prevent more line from paying out than necessary.

The improved device is simple in construction, and can be applied at small expense to reels already manufactured, and can be applied without materially increasing the expense.

What is claimed is:—

1. The combination with a casting reel including a casing and a spool having a trunnion, a body on the trunnion having a cavity in one of its faces, a disk loose upon the trunnion, and a ball in said cavity and bearing against said disk.

2. A casting reel including a spool having a trunnion and a conical cavity concentric with the trunnion, a disk loose upon the trunnion, and a ball within the cavity and engaging the disk.

3. A casting reel including a spool having a trunnion and a conical cavity concentric with the trunnion, a casing, a disk loose upon the trunnion and bearing against the casing, and a ball within the cavity and bearing against the disk.

4. A casting reel including a spool having a conical cavity, a loosely arranged disk, a ball within said cavity and bearing against said disk.

5. A casting reel including a spool having a conical cavity, a casing for the spool, a disk loosely bearing against the casing, and a ball within the cavity and bearing against the disk.

6. A casting reel including a spool having a trunnion, a retarding driven member loosely mounted on the trunnion, and movable means engaging the spool and retarding member to move the latter and coöperating therewith to gradually reduce the retarding action of said member upon rotation of the spool.

7. A casting reel including a spool, a removable retarding member, and a ball mounted for movement between the retarding member and the spool and having frictional engagement with the retarding member and spool to gradually reduce the retarding action of the latter.

8. A casting reel including a spool, a movable driven member disposed adjacent one end of the spool, and means between the spool and the driven member to operate the latter when the former is operated and to decrease the retarding action of the member as the speed of the spool increases.

9. A casting reel including a spool, a retarding disk loosely mounted adjacent the spool at one end thereof, and a loosely mounted member to engage and frictionally drive said disk upon rotation of the spool to reduce the retarding action of the disk.

10. A casting reel including a spool, a retarding driven member movably mounted adjacent the spool, and movable means engaging the spool and retarding member to move the latter and coöperate therewith to gradually reduce the retarding action of said retarding member upon rotation of the spool.

In testimony whereof I affix my signature, in presence of two witnesses.

WALTER T. BRONSON.

Witnesses:
 George Oltsch,
 G. M. Cole.